United States Patent

Chancel

[15] 3,688,500

[45] Sept. 5, 1972

[54] FLUID PRESSURE SYSTEM FOR OBTAINING, CONTROLLING OR CORRECTING MICROMETRIC DISPLACEMENTS IN MACHINE-TOOLS AND OTHER APPARATUS

[72] Inventor: Marcel Georges Chancel, 218, rue Gabriel Peri, Vitry sur Seine, France

[22] Filed: Sept. 17, 1969

[21] Appl. No.: 858,738

[52] U.S. Cl..............60/54.5 R, 83/915.5, 269/22, 91/433
[51] Int. Cl..........F15b 7/00, F15b 13/14, B23q 3/08
[58] Field of Search..........60/54.5 H, 54.5; 83/915.5; 269/22; 91/1, 4, 33; 417/44

[56] References Cited

UNITED STATES PATENTS

| | | | |
|---|---|---|---|
| 2,354,562 | 5/1944 | Webb | 91/433 |
| 1,735,964 | 11/1929 | Eule | 60/54.5 |
| 3,295,450 | 1/1967 | Schonwald et al. | 417/44 |
| 3,277,791 | 10/1966 | Williams et al. | 91/1 |
| 2,800,055 | 7/1957 | May | 60/54.5 |
| 3,333,417 | 8/1967 | Hinde | 60/54.5 H |

*Primary Examiner*—Martin P. Schwadron
*Assistant Examiner*—A. M. Zupcic
*Attorney*—Brown, Murray, Flick & Peckham

[57] ABSTRACT

This invention relates to a procedure and installatio to obtain, control and correct micrometric displacements of machine tools or other apparatus, wherein one or more elements which deform under internal pressure are placed between two components of a machine and the micro-displacements obtained are measured against a reference element submitted to the same pressure but, if necessary, positioned outside the machine so that the measuring or control apparatus is not subjected to the disturbing effects of vibrations, noises or other causes.

3 Claims, 12 Drawing Figures

FLUID PRESSURE SYSTEM FOR OBTAINING, CONTROLLING OR CORRECTING MICROMETRIC DISPLACEMENTS IN MACHINE-TOOLS AND OTHER APPARATUS

Certain machine parts necessitate great precision at the manufacturing stage.

However, machine-tools and other apparatus at present used for such manufacture show certain imperfections which make it impossible to achieve the required micrometric precisions.

The main causes of inaccuracies are notably:

Variations in levelling instruments. Movements of earth, foundations and fixings;

Distortions of frameworks through expansions or contractions of thermal origin, application of heat, or ageing;

Bending due to work stresses or to displacements of certain large masses;

Working tolerances, collapse of oil films, inaccuracies in the guides;

Tolerances and parasite shifting of positioning control systems (Vernier gauges, sprockets, screws, etc.);

Tolerances in ball-bearings or other bearings;

Parasite movements in the slide locking systems;

Wear of tools, sliding parts or other parts;

Inaccurate readings of Vernier gauges, maladroitness of operators;

Variations in lubricant viscosities;

Vibrations.

New remedies are constantly applied to these causes of inaccuracies. Normally these remedies lead to a complication of mechanisms, supplementary constraints on use, etc., whence an increase in the cost of the machines and, equally, of their running cost.

It must be emphasized that unsatisfactory results from machines are (except for causes relating to vibrations) generally due to small divergencies in position between the place actually occupied by a certain machine component (structural element, pin, tool, tool-holder, part-holder, part, etc.) and the place it ought to occupy.

These divergencies are generally very small, and progress tends to reduce them a little more each day.

Thus, to improve the precision of machines, one must accurately obtain, control, inspect, etc., "divergencies" or displacements of approximately the same value as the divergencies, distortions, tolerances, etc., which cause inaccuracy; i.e., displacements having (i) a minimum value of the order of one-tenth micron; (ii) a maximum value of the order of one-tenth millimeter.

Indeed, the first difficulties or uncertainties are encountered with precisions less than one-tenth millimeter. Overcoming these difficulties entails complexities of conception or construction, with a consequent increase in manufacturing or running costs.

Also, the present limit of ambitions, if not the needs, of engineering is situated around one-tenth micron.

A displacement of extremely small amplitude can easily be obtained by acting with considerable — thus easily controllable force on a driven component, which extends, collapses or bends.

This principle is often practised when the users "manipulate to determine the final dimension" with the flexion of a machine's fixed stop or other similar component.

The present invention therefore aims at remedying these drawbacks and to this end concerns a process to obtain micrometric displacements on precision machine-tools, wherein at least one element which distorts under internal pressure is placed between two components of a machine and the distortions obtained between the machine components are verified by comparison with an identical deforming element submitted to the same pressure.

The invention also concerns an installation for implementing the process for controlling micrometric displacements, wherein a pressure generator is connected to the deforming elements being used and to the reference element; the distortions of one of these elements act on a measuring device connected to a regulator, which acts on the pressure generator to correct the pressure value within the deforming elements in accordance with the data provided by the measuring device.

The invention also extends to the undermentioned characteristics as well as their divers possible combinations.

An installation conforming to the invention is shown as a non-restrictive example in the attached drawings, in which.

Figure 4:
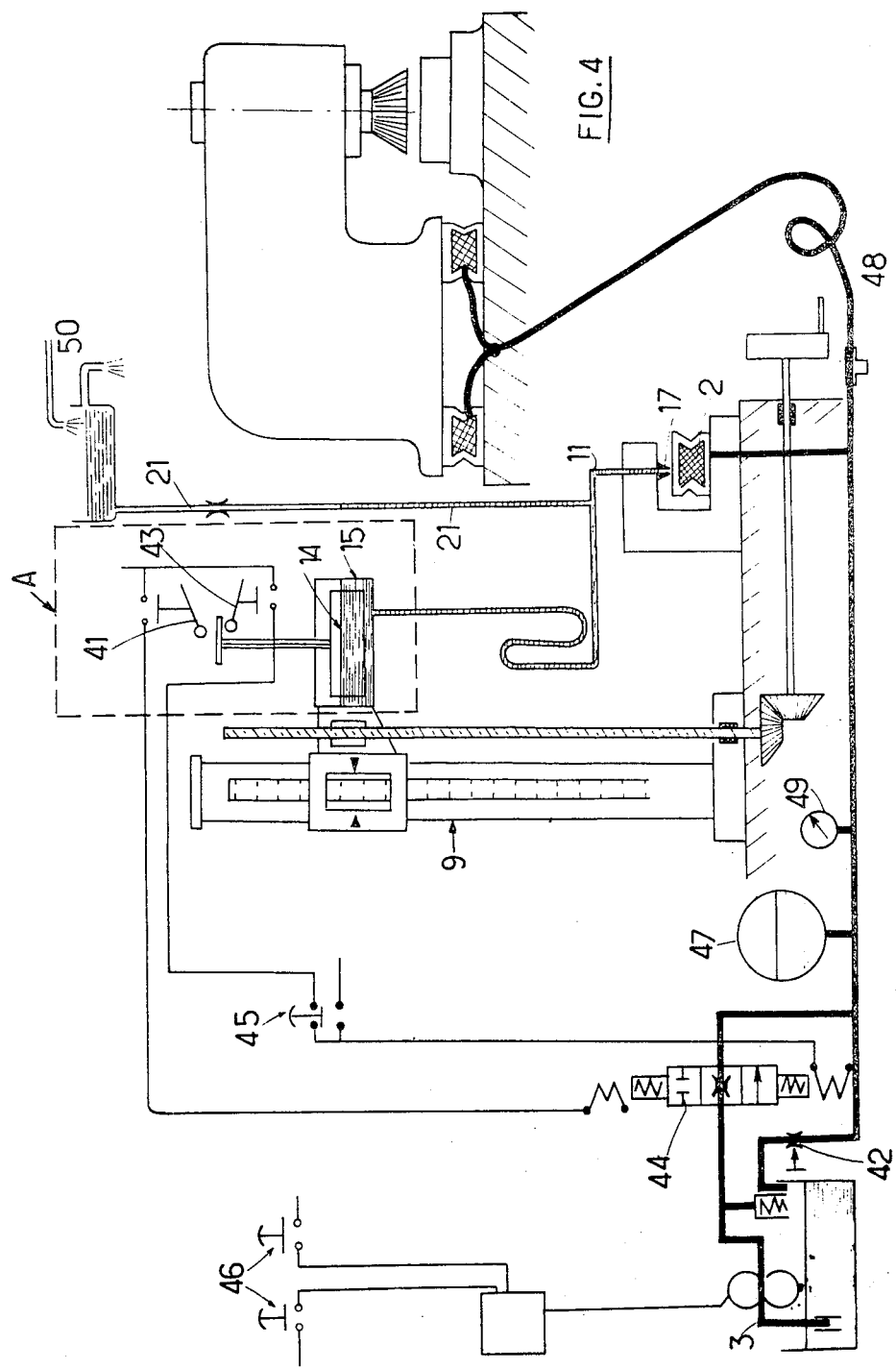
Figure 6:
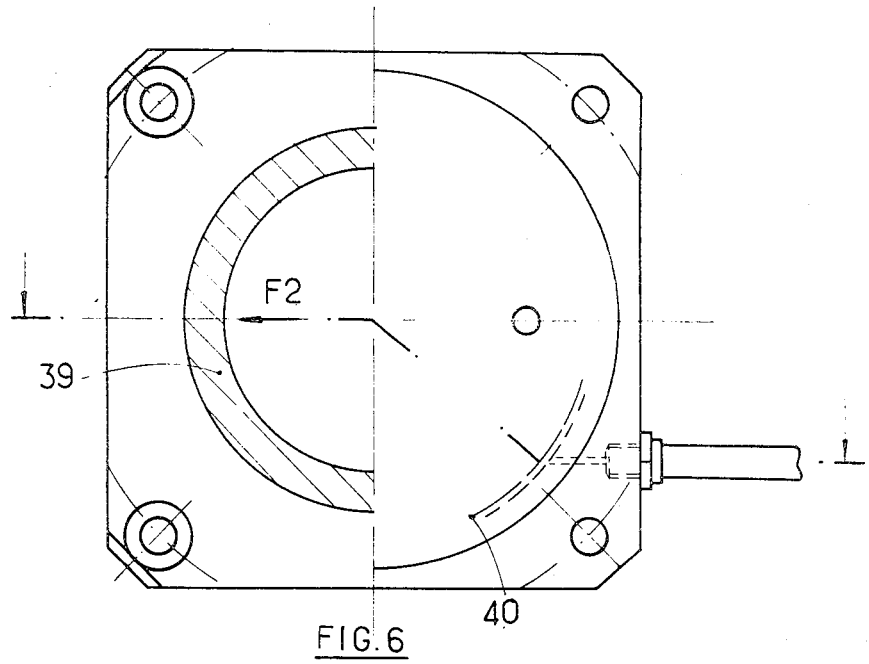
Figure 5:
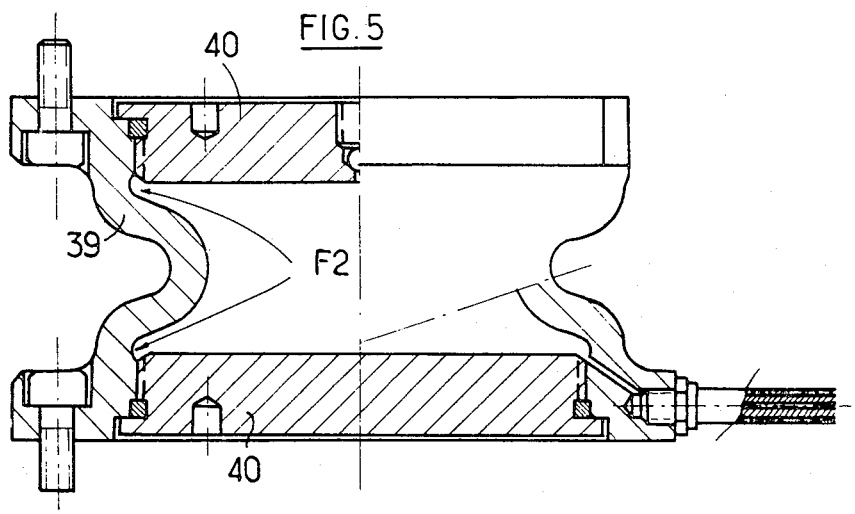

FIG. 4 also represents a method of realization, using electrical and hydraulic means;

FIGS. 5 and 6 represent a method of realization of deforming elements generating micro-displacements;

FIGS. 7 to 12 represent various methods of application to machines or machine-tool components.

Figure 1:
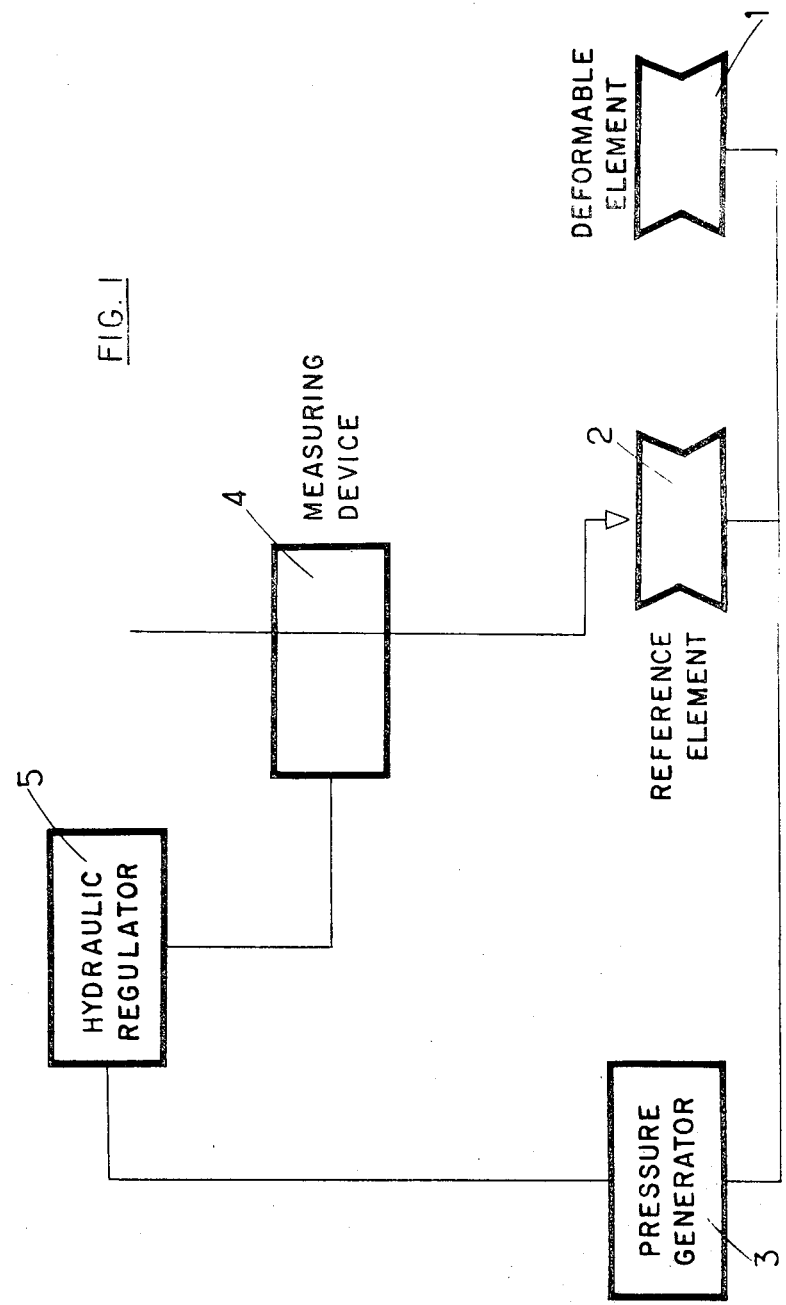
FIG. 1 is a diagrammatic view of the installation conforming to the invention.

Reference 1 of the installation illustrated diagrammatically in FIG. 1 indicates the deforming element positioned in a specific part of the machine-tool, whilst reference 2 indicates the reference deforming element permitting inspection of distortion by analogy to deforming element 1.

These two components are connected up and fed from a pressure generator 3.

Measurement and readjustment means, schematized under 4, are influenced by modifications in the volume of reference element 2 and influence a hydraulic regulator or distributor 5 which, acting on a pressure generator 3 connected to deforming and reference components 1 and 2, maintains the dimension of these components at the desired value. The measuring apparatus 4 may be adjusted so as to alter distortion of the deforming elements at will.

Figure 2:
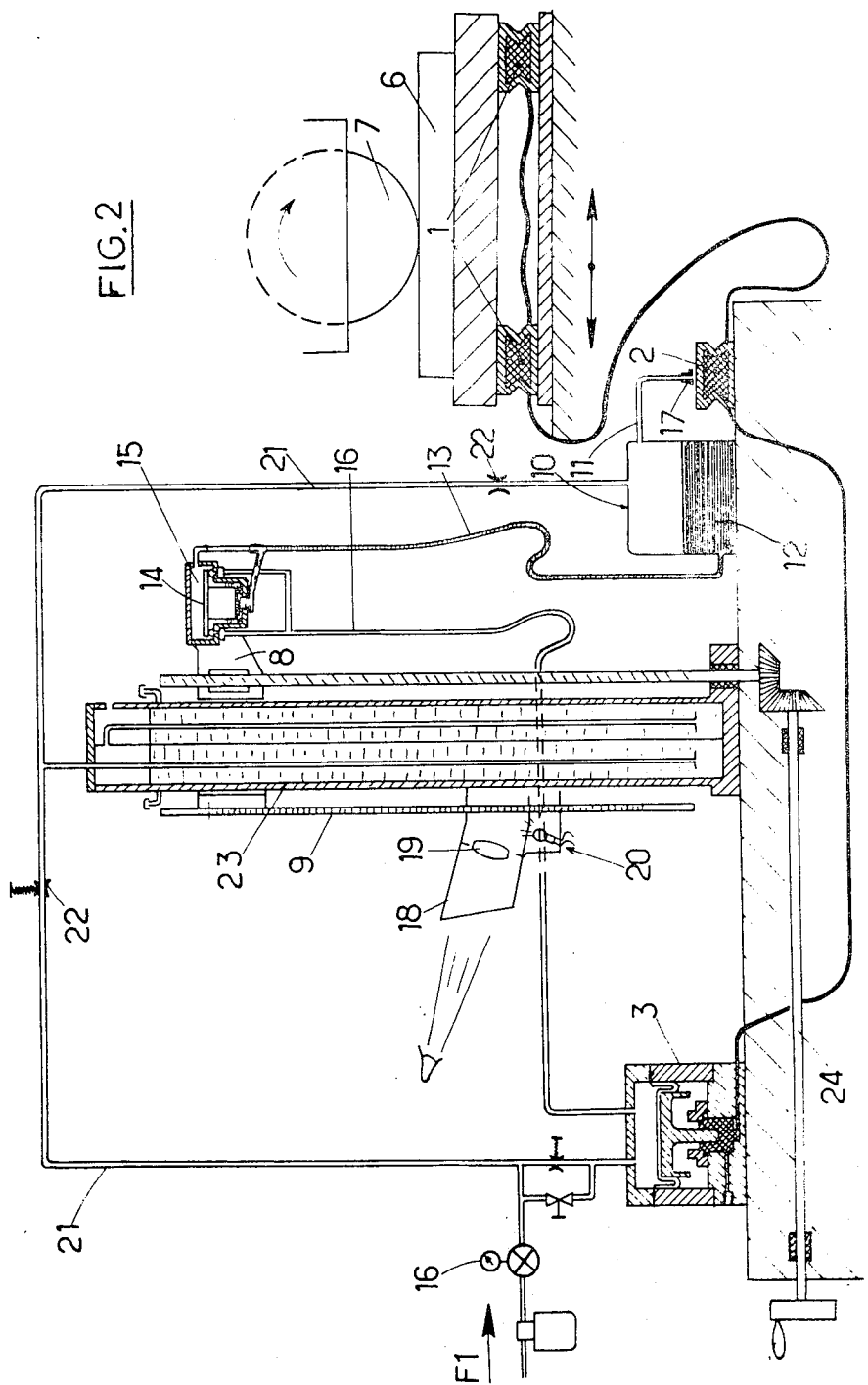
FIG. 2 represents a method of realizing an installation comprising control and readjustment components.

FIG. 2 represents an initial practical application of an installation necessary for the implementation of the process defined above. To describe this figure, let us imagine a surface grinder equipped with micro-displacement equipment. The operator wishes to displace part 6 in relation to tool 7 by, for example, 8 centimeters 3 microns and seven-tenths micron. To do this, he displaces the cursor 8 until the pointer is opposite the division corresponding to this mark on the graduated, adjusted ruler 9. The fluid under pressure then arrives in a receptacle 10 before being distributed via pipe 11 and nozzle 17 on reference deforming element 2.

The arrival of fluid under pressure is effected as indicated by the arrow F1. The fluid is then directed a. for inspection and readjustment purposes, towards a receptacle 10 before being sent via pipe 11 and nozzle 17 towards reference deforming element 2; b. towards the pressure generator 3.

As deforming elements 1 and 2 are in circuit, they are subjected to pressure furnished by generator 3 which multiplies the pressure it receives from F1, and they expand. Expansion of reference element 2 restrains the escape of fluid, notably air, at the orifice of nozzle 17. The pressure then increases in receptacle 10. This pressure has repercussions on liquid 12 contained in receptacle 10 aforementioned and the liquid rises in the flexible duct 13 until ball-float 14 is displaced in the body of regulator 15 and uncovers the orifices of flexible pipes 16 connected to pressure generator 3.

Pressure inside the generator is then reduced, fluid escaping into the regulator via regulating nozzles (formed by the orifices of the flexible liaison pipes). As the total flow from these nozzles is superior to the flow from feed nozzle 16, the pressure tends to fall in the multiplier.

The slightest fall in pressure in the multiplier is immediately transmitted to the deforming elements, which contract; this allows the fluid brought by pipe 11 to escape more abundantly via nozzle 17. The level of liquid in pipe 13 automatically falls, ball-float 14 then totally or partially blocks the regulating nozzles formed by the orifices of pipes 16, and this has the effect of re-establishing in the amplifier - thus in the deforming elements - the exact pressure desired.

As an example, on the graduated scale, one-tenth of a micron corresponds to a height of liquid of 1 mm.

As a variant, it is possible to produce a ball-float and nozzles such that the level stabilizes to within one - two-tenths of a mm., thus maintaining the height of the deforming elements to within one - two hundredths of a micron.

In fact, the ball-float can be balanced so that when it is raised, it liberates the nozzle exhausts one after the other.

The nozzles are of small diameter, and a rise of the ball-float of one-tenth of a millimeter suffices to double their delivery.

Only one connection is necessary at F1: (compressed air between 5 and 7 kg/cm$^2$).

There are practically no movable parts in the whole mechanism.

It can be placed outside the machine, still permitting accurate verification of actual displacement.

According to the method of application illustrated in FIG. 2, the graduated measure 9 travels with arm 8 supporting regulator 15 and thus enables the operator to take readings easily. To improve reading still further, a sighting-piece 18 with magnifying-glass 19 and, possibly, lighting 20 are foreseen.

Before reaching control nozzle 17, air passing into duct 21 is stabilized at constant pressure, for example by jets 22 of different section placed on the control circuit in such a way that the surplus, unused air must, in order to escape, overcome the resistance offered by the two columns of liquid contained in 23.

The feed pressure is thus perfectly regulated and allows work to be done in a more suitable control pressure range.

The space occupied can be reduced.

As the role of the operator is limited to shifting the scaled measure to the position corresponding to the desired micro-displacements, risks of errors or blunders are practically non-existent and the regulating is rapidly carried out.

In accordance with the application illustrated in this FIG. 2, a mechanical control is foreseen and can be automated or pre-defined, or programmed.

Figure 3:
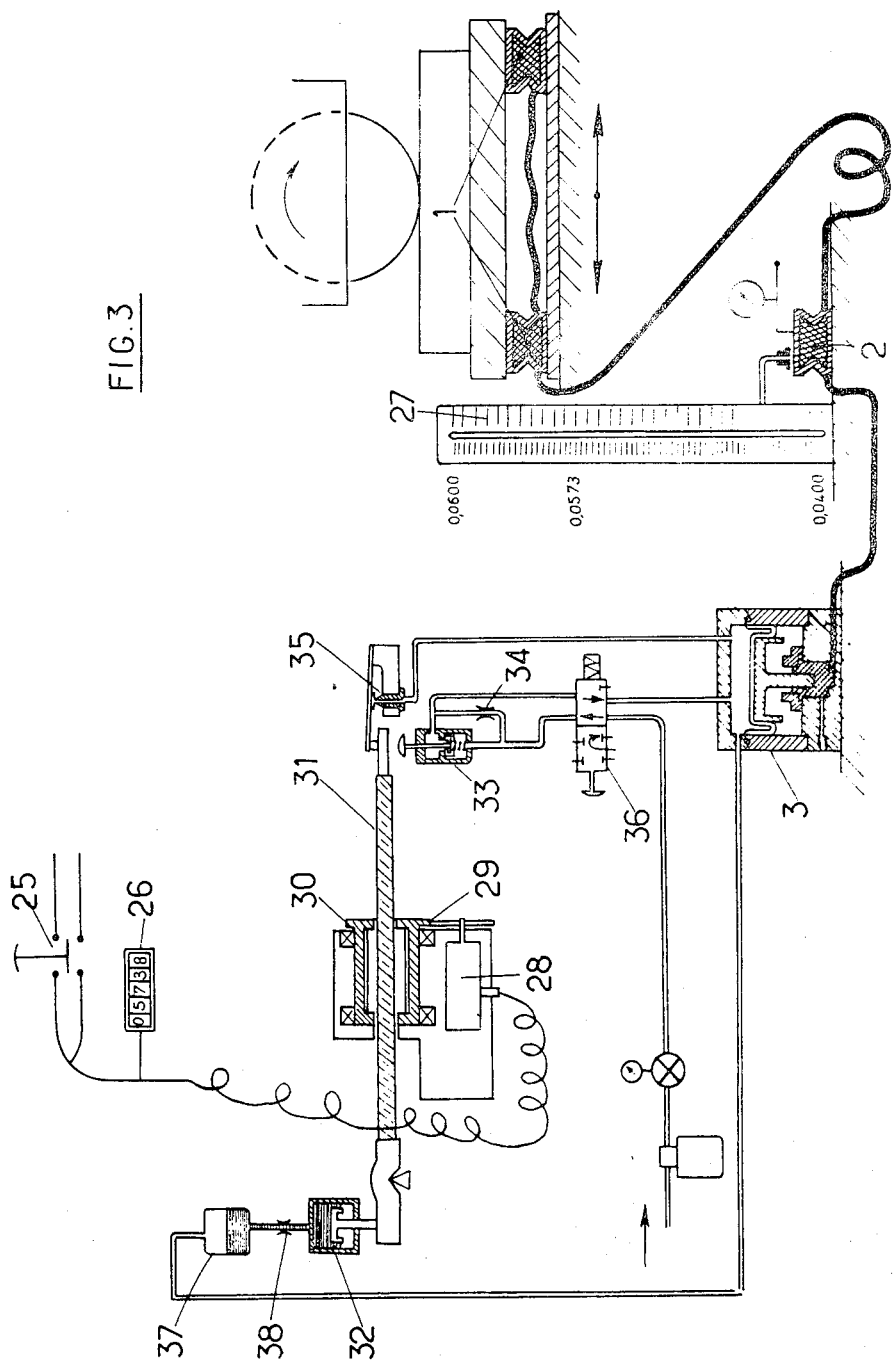
FIG. 3 represents another method of realizing installations using some items as readjustment components.

Another method of application is shown in FIG. 3. The installations illustrated in FIGS. 2 and 3 present numerous similarities, particularly in the positioning of elements distorting the control components; the installation shown in FIG. 3 also permits remote control of displacements obtained on the machine itself.

The control and adjustment components illustrated in this figure do not allow the self-adjustment of the desired displacement, but merely maintain constant the pressure inside the deforming elements.

Supposing the operator wishes to obtain the measurement 0.0573 mm., i.e. a displacement of five hundred seventy three tenths of a micron. To do so, he acts in one direction or other upon an electric switch 25 and ceases his action when the desired figure appears on the meter 26. He verifies on the graduated scale of the gauge 27 if the measurement is attained and, if not, makes the necessary correction.

The switch 25 controls a small motor 28 whose revolutions are numbered on a meter 26. This motor, through the transmission gear 29 and nut 30, shifts the assembly of which it forms part and which is simply a counterweight on the threaded arm 31. The balance of the arm, previously obtained through the membrane 32 being submitted to the pressure reigning in the multiplier, is upset. The arm dips and pushes heavily on the control of valve 33 (accelerated ascent) which induces air under pressure to the multiplier. The latter sends the high pressure into the deforming elements 1 and 2 which expand, with pressure also arriving in the reservoir 32. The air pressure reigning 32 is equal to that acting on the multiplier. This latter pressure tends to balance the arm 31 which no longer acts on valve 33. The air passing into 34 at a weak rate continues to make the pressure in the multiplier rise slowly, with the resultant consequences.

The pressure generated in 32 continues to make the arm 31 rise slowly until it enters into contact with the valve 35. This latter is exceedingly sensitive and opens under the slightest stress. Its delivery to the atmosphere is superior to that of orifice 34. The pressure in the multiplier therefore decreases. But, as soon as this pressure decreases, the arm dips and the valve 35 no longer delivers to the atmosphere. The pressure increases again via the delivery from 34, and so on.

By these means, then, the arm 31 is stabilized and this unit acts as a very sensitive, self-equilibrating pneumatic balance.

At 36, a distributor permits "rapid descent;" 37 and 38 are components which act as a shock-absorber.

As can be seen, this "pneumatic balance" is extremely accurate and permits the control of pressures in elements 1 and 2 in such a way that distortions therein are extremely feeble in comparison with displacement values obtained by machine operators in industry using conventional methods.

In FIG. 3, the control components, such as pneumatic gauge, electronic comparator, etc., are stocked in commerce as standard components of current supplies.

The system of measuring pneumatically or electronically can in this case only cover a small part of the measuring scale with very great accuracy.

This small part of the scale can be controlled by a classic comparator to the nearest micron.

Finally, automation is complete if switch 25 is controlled by means of any system in function of results registered by the control component 27 (e.g., photo-electric cell, electronic gauge, proximity contact, etc.).

A different application is represented in FIG. 4. It presents numerous analogies with the installations shown in FIGS. 2 and 3.

In the description of the embodiment shown in FIG. 4, all the elements shown in FIG. 1 are referred to, namely:

the deforming elements under references 1 and 2;
the pressure generator under reference 3;
the group A under reference 4;
the hydraulic distributor under reference 5, shown as reference 44 in said FIG. 2.

This application is essentially different from the preceding ones in that here the pressure generator 3 is a high pressure hydraulic group, and also the control circuit 11 is fed by a liquid and not by compressed air or other gas.

The pressure of the liquid is obtained by its own weight in the column formed by the feed piping 21.

The upper reservoir 50, at a constant level, feeds piping 11, the exit nozzle of which 17 measures expansions of reference element 2.

This circuit is insensitive to atmospheric pressure variations since all exits are in contact with the ambient atmosphere.

In the same way as in the FIG. 2 installation, the column of liquid rises in the reservoir 15 when pilot element 2 expands.

This raising of the level raises the ball-float 14 which acts on the upper electrical contact 41.

This electrical contact closes the delivery from the hydraulic group generating high pressure, by way of the hydraulic distributor 44.

A small leak is incorporated in 42 so that the pressure in the high pressure circuit lessens gradually, allowing progressive decompression of the accumulator 47.

Consequently, the deforming elements 1 and 2 contract slowly, and this increases the outlet, and hence the delivery at the exit nozzle 17 in pipework 11 and makes the level descend in the reservoir 15.

The ball-float no longer acts on the upper micro-contact 41, and this enables the hydraulic distributor 44 to return to its mean position and results in a slow increase in pressure in the hydraulic circuit and in the deforming elements; in effect, the outflow from the distributor 44 in a mean position is greater than that from the leak incorporated in 42; for this reason, with the elements swelling under the influence of pressure, the outlet at 17 decreases, the column of liquid rises in the piping 11, and so on, in this way keeping the dimensions of the deforming elements 1 and 2 almost constant.

Like the upper micro-contact, the lower micro-contact 43 of the ball-float 14 acts on the distributor 44, and serves to increase pressure rapidly when the group A is displaced a considerable-amount along its column as required for the desired micro-displacements.

On this circuit also, as moreover on the high pressure circuits of FIGS. 2 and 3, a joint 48 can be connected which permits the simultaneous or separate alimentation of other groups of deforming elements.

A single installation for supervision and readjustment and a single pressure generator can also serve different purposes and even control micro-displacements on several machines.

A manometer 49 can also be connected into the high pressure circuit, to indicate the value of the pressure acting in the deforming elements.

For each variation in pressure there is a corresponding variation in size of the deforming elements.

For example, if a variation in pressure of 0.2 bars/cm$^2$ corresponds to an expansion of one-tenth of a micron, the manometer can be calibrated and graduated in such a way as to indicate in microns or fractions of a micron the micro-displacements obtained by the deforming elements.

The installation described in FIG. 4 is extremely easy to use, since the operator can obtain the micro-displacement he desires simply by displacing the group A on its supporting column and reading the required measurement on the calibrated rule 9.

The majority of components in this installation are diffused in commerce.

The generator, which in this figure is a hydraulic group, permits unlimited feeding of any number of components, regardless of their dimensions.

It can also tolerate some leaks in the high pressure circuit and thus permits the connecting and disconnecting of the different machines or apparatus which may have to be controlled by the same inspection and readjustment installation, as it allows feeding of deforming elements mounted on a part animated by a rotary movement.

For example, broaches or tool-holders.

In this case, these elements are generally fed by means of revolving joints or couplings mounted on the piping and these joints rarely have no leaks, whence the necessity for having at one's disposal both pressure and a delivery.

FIGS. 5 and 6 each represent the deforming element which generates micro-displacements: FIG. 5 shows a vertical cross-section seen in elevation, FIG. 6 a cross-section seen from above. This deforming element is made up of three components:

a main body 39 and two platens 40 which hermetically seal the orifices of the main body 39. This body presents a hollow annular distortion such that it lends itself to axial distortions under the effect of internal pressure via elasticity of the area delimited by arrows F2.

Figure 7:
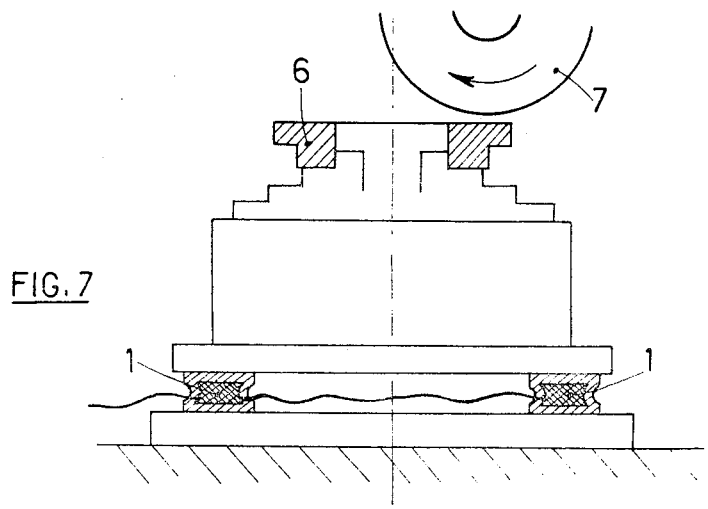

Various applications are noted hereafter and illustrated in FIGS. 7 to 12. Thus FIG. 7 represents a precision mandrel holding the piece 6 to be machined.

Other precision mandrels or sine-bars, vices and other fixing systems for parts can also be provided with a micro-displacement device.

As with magnetic platens, they then constitute homogeneous, independent units.

They can be coupled or uncoupled separately from the pressure generators and checking components.

In effect, the adjustment checking systems and the pressure generators can control alternatively or simultaneously one or several groups such as mandrels, magnetic platen, poppet-head, loose head, tool-holders, machine components, etc., making use of the connecting joint 48 with one or several connections.

Figure 8:
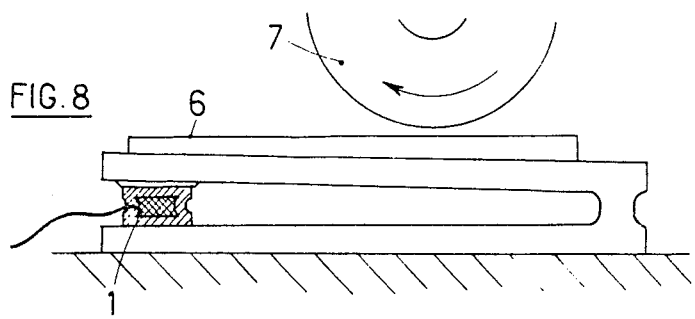

FIG. 8 shows another application. With this one, magnetic platens, sine-bars, vices, and mandrels can be equipped with deforming elements which allow a very slight rotation, or false parallelism, and permit very accurate rectification of conic plugs or other similar parts.

Among other applications which can be foreseen, and not shown on the attached figures, mention can be made of:

surface grinders in which the deforming elements shown in FIGS. 2, 3 and 4 can be included in the engine columns and placed, for example, under the table or poppet-head pin carrier;

all other grinders or precision machines and amongst others, machines to grind the internal and external casing of cylinders, precision markers and drilling machines, etc., to obtain the desired displacements between tools and parts to be machined as well as to verify or correct the distortion of their frameworks;

machines which grind directly from solid or submerged sections in which the deforming elements permit continuous correction of wear of the grinding wheels;

lathes of large dimensions for tool gear correction as well as for obtaining slight convex curves as on paper-mill cylinders;

sight glasses of lathes or grinders for their alignment at the diameter or vertically;

readjustments of tools in general, out of the machine or whilst it is in operation, and the extraction of tools at one end of their work passage to avoid their leaving traces on their return journey;

devices to correct guide screws in machines to rectify screw threads or other items, as well as in numerically controlled machines, etc.;

all machining tools.

Figure 9:
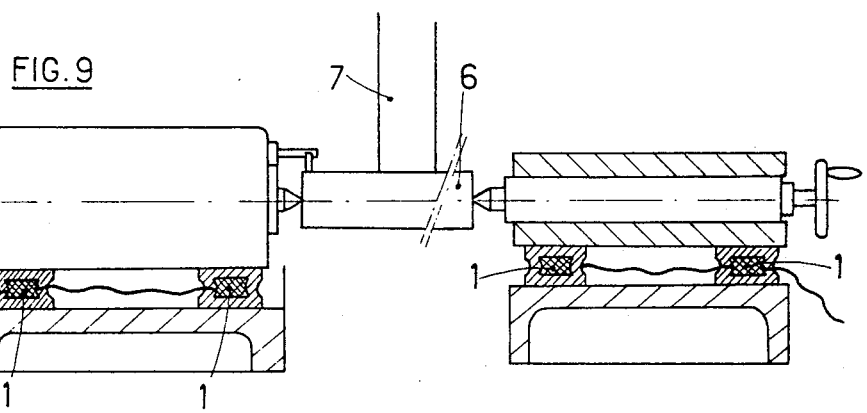
Figure 10:
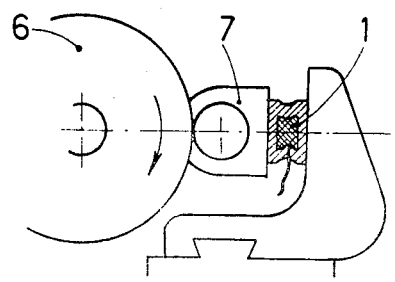
Figure 11:
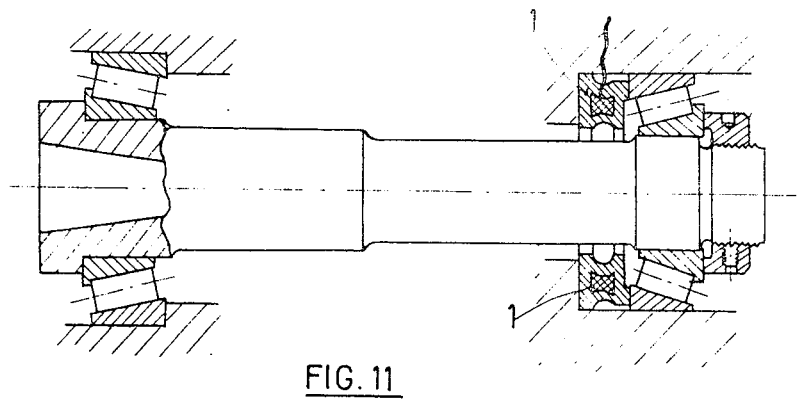

Other applications are also shown in FIGS. 9 and 10 for adaptation onto a cylindrical grinder.

A micro-displacement device can be included in the support of the feed poppet-head of the rotating part, as well as in the loose head of a cylindrical grinder.

The advantages to be drawn from such an application are equally numerous:

take-up of wear of the grinding wheel;

take-up of differences in diameter due to regrinding (diamonding);

stoppage of work when the theoretical or actual measurement is attained;

submerged work, etc.

It is equally possible, by controlling the deforming elements included in the feed poppet-head separately from those in the loose head, to obtain take-up of faults in the alignment of these parts or very accurate fine cones.

FIG. 4, shows a machine-tool broach. An annular or toric-shaped deforming work element 1, or several deforming elements positioned on a circumference, permit the adjustment of the play of a bearing, in function of its temperature, the loads it bears, the linear expansion of the broach, or the accuracy of work demanded. The controlled expansion of this or these elements have a direct influence on the quality and accuracy of the work carried out by the machine-tool, or on the part, which is supported by the broach.

Figure 12:
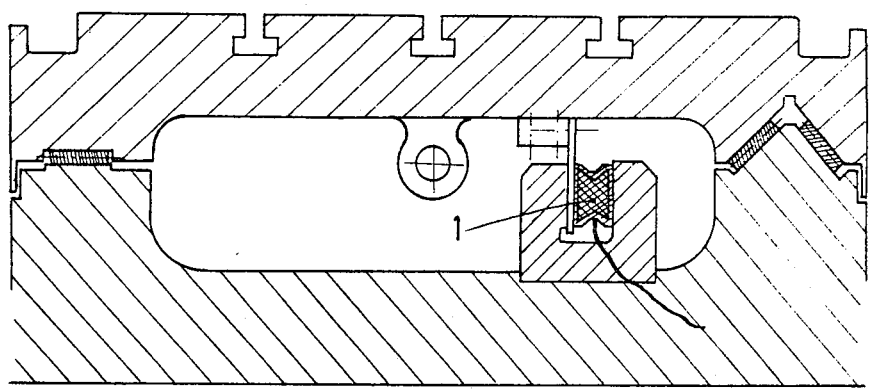

Finally, FIG. 12 shows a device for blocking slides.

Precision machines, such as markers and grinders, often have tables sliding on bearings, needle points, or shoes with ball circulation. For these reasons, it is difficult to block them into position when work requires it. In effect, attempts at blocking risk deteriorating the contact surfaces of the bearings themselves.

The deforming elements can be used as shown in FIG. 12.

This is an instance of a less noble application, since there is no longer any question of micro-displacement.

In this case, the deforming elements function on an "all or nothing" basis. The "adjustment" part of FIGS. 1, 2, 3 and 4 is unnecessary. All that is needed is a source of pressure.

Thanks to their small bulk and their great power, the deforming elements can be included in already-existing machines.

Independently of the applications cited heretofore, certain others are equally worthy of retention.

There is a demand in certain other domains, listed below, where applications are possible; such as:

control machines and even inspection and measuring apparatus;

surface-plates for inspection and measurement (maintenance of horizontal and vertical planes);

industrial optics (controls and measurements by luminous rays and prism effects); optic fabrication;

research laboratory, testing machines;

precision shearing machines (blade clearance device);

precision rolling-mills (thin blades, precious metals);

electro-erosion machines;

lasers, etc.

Finally, each time that the presence of an operator beside the machine or component at work is dangerous or distressing; as is the case with noisy or projecting machinery: sparks, shavings or other materials, and when there is radiation, as in atomic industry for example, necessitate the isolation of the control post.

By using the procedure described above, it is thus possible:

on the one hand, to remedy the majority of geometrical faults and inaccuracies noted on machine-tools or similar objects, and to do so whilst the machine is at rest or in the course of work;

and, on the other hand, to create and control perfectly micrometric movements while eliminating the inconveniences of classic mechanisms and considerably reducing the causes of errors by operators.

Simplification of the regulating machines and precision apparatus also has the advantage of saving a considerable amount of time.

It should be understood that the invention is not limited to the embodiments described and represented above; from these it is possible to foresee other variations which in no way exceed the scope of the invention.

What is claimed is:

1. Apparatus for controlling micrometric displacements on precision machine-tools, comprising a hollow deformable element adapted to be placed between two components of a machine, a like hollow deformable reference element, means for generating fluid pressure connected to said elements for applying internal pressure to them, a measuring device controlled by said reference element, and a pressure regulator for said pressure generating means, said regulator being controlled by said measuring device to correct the pressure within said deformable elements in accordance with the data provided by the measuring device, said measuring device including a graduated member, an electric switch connected with said pressure regulator, and means controlled by said reference element for operating the switch, said switch-operating means being adjustable along said graduated member.

2. Apparatus according to claim 1, including a movable contact for said switch, a liquid reservoir, a float in the reservoir supporting said contact, a conduit connected with the reservoir and having an outlet adjacent said reference element, and means for supplying liquid to the reservoir, the reference element controlling said conduit outlet and hence the level of the liquid in the reservoir.

3. Apparatus for controlling micrometric displacements on precision machine-tools, comprising a hollow deformable element adapted to be placed between two components of a machine, a like hollow deformable reference element, means for generating fluid pressure connected to said elements for applying internal pressure to them, a measuring device controlled by said reference element, and a pressure regulator for said pressure generating means, said regulator being controlled by said measuring device to correct the pressure within said deformable elements in accordance with the data provided by the measuring device, said pressure regulator including a three-position valve operated by said measuring device with said valve positions consisting of a normal restricted passage and a fully open passage and a closed position, and said measuring device including an electric switch for operating said valve and having a movable contact, a liquid reservoir, a float in the reservoir supporting said contact, a conduit connnected with the reservoir and having an outlet adjacent said reference element, and means for supplying liquid to the reservoir, the reference element controlling said conduit outlet and hence the level of the liquid in the reservoir.

* * * * *